Oct. 13, 1953
C. E. MAIER
2,654,914
METHOD OF FORMING CLOSURE CAPS BY MOLDING AND
PARTIALLY FLUXING A PASTE RESIN COMPOSITION
WITH SUBSEQUENT FINAL FLUXING THEREAFTER
Filed July 27, 1950
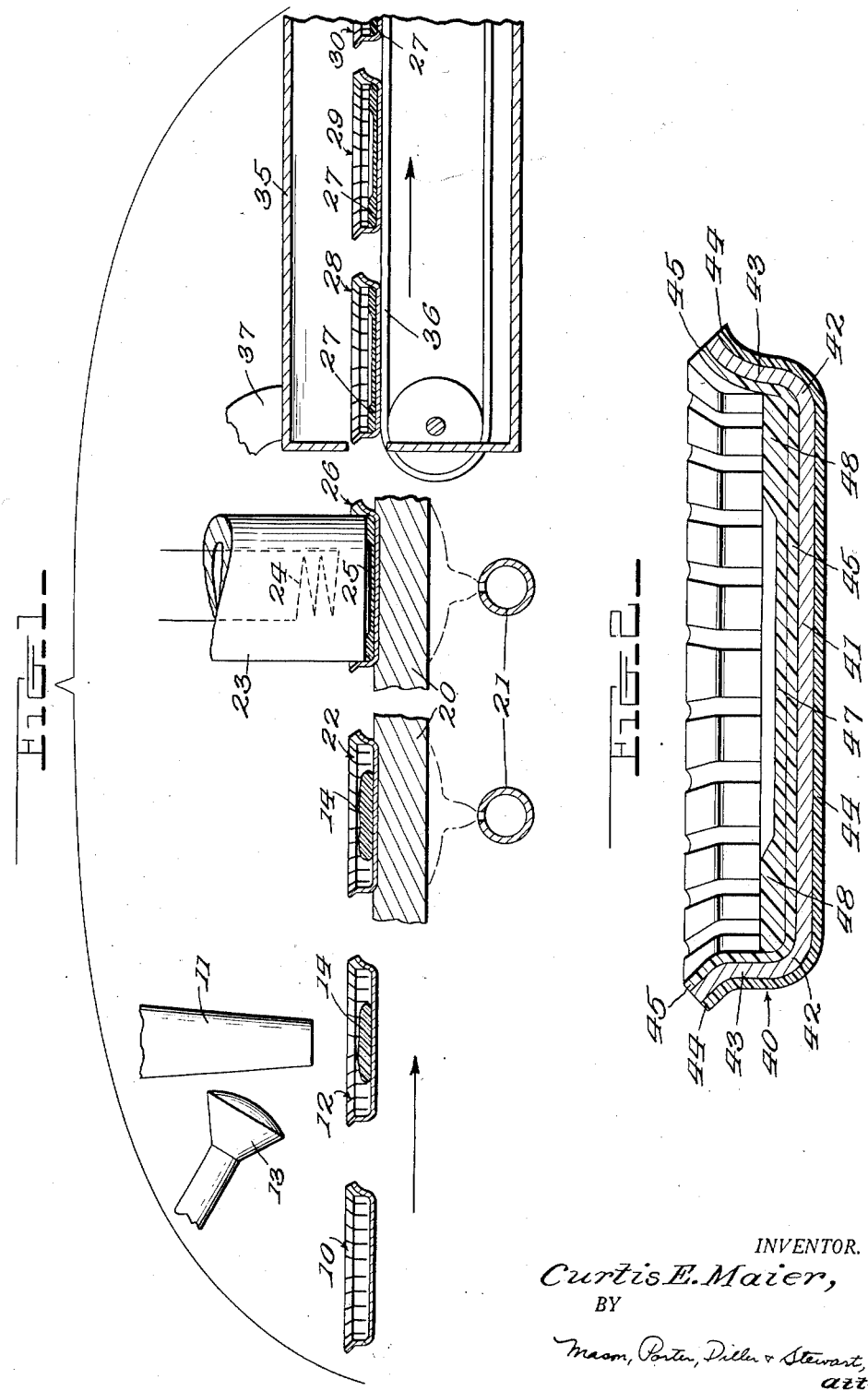
INVENTOR.
Curtis E. Maier,
BY
Mason, Porter, Diller & Stewart,
attys.

Patented Oct. 13, 1953

2,654,914

UNITED STATES PATENT OFFICE 2,654,914

METHOD OF FORMING CLOSURE CAPS BY MOLDING AND PARTIALLY FLUXING A PASTE RESIN COMPOSITION WITH SUBSEQUENT FINAL FLUXING THEREAFTER

Curtis E. Maier, Riverside, Ill., assignor to Continental Can Company, Inc., New York, N. Y., a corporation of New York Application July 27, 1950, Serial No. 176,218

8 Claims. (Cl. 18—59)

This invention relates to the rapid production of closure seals for containers, including the forming of a shaped cushion pad or sealing member.

It has been proposed and is a practice to form such crown seals with the usual metal shell having a cushion pad therein, made of rubber composition, or of a like elastomer compound. However, when the composition was introduced in the form of a solution or emulsion, for the necessary liquidity of application, rotation of the shell is required for distribution, the composition is not form-maintaining in itself, a lengthy period is required for elimination of the solvent or like vehicle, and the distribution cannot be controlled with assured accuracy, nor can special contours in the sealing area or in the center be attained for maximum sealing efficiency and minimum use of material. Also, curing could only be effected after such solvent was eliminated. On the other hand, when the composition was introduced as a blank, care was required for producing the necessary adhesion in the crown shell and high pressures and temperatures were required for molding. Further, if the blank or disc is cut out from a web, either frame scrap loss or reworking cost is involved; and at least one additional operation is involved in cutting and placing the blank or disc.

When a crown seal is to be used for capping a bottle or other container, the cushion pad serves to conform to the possibly irregular lip of the container, providing a gasket between such lip and the closing face of the metal crown shell itself. The crown seal usually has a further demand upon it, being that of preventing contacts of the contents of the container with the metal at the inner face of the crown shell. These two requirements may be satisfied by materials insoluble and essentially non-permeable to the contents of the container, but in practice such materials do not demand as great a thickness for protection against penetration as is required for providing the necessary sealing gasket for conformation to the container lip. Accordingly, it is preferred in accordance with this invention to provide a crown seal in which the sealing member or cushion pad has a thick outer annular portion for engagement with the container lip, and a thinner central portion to provide the assurance against contact of the contents of the container with the metal of the crown shell.

It has been found that by using compositions formed by dispersing fine particles of resin in a liquid plasticizer, it is feasible to deposit a measured quantity of such dispersion in a hot or cold closure shell, then shape by a shaping punch or plunger and partially cure the composition by heating for producing a temperature in the plasticizer, particularly in the surface regions of said deposit, which causes the plasticizer to dissolve or flux the resin, so to speak, so that a form-maintaining body is produced that adheres to the crown shell; making it feasible to remove the partially-fluxed closure cap from the said punch, and thereafter continue the heating thereof until the plasticizer and resin have formed a substantially uniform, thermoplastic, shaped cushion pad which upon cooling maintains desirable characteristics under the conditions of service. That is, the fusion or dissolution of the vinyl resin into the said plasticizer, to provide the final fluxed mass, is accomplished in two steps, in the first of which a shaping is also accomplished incident to a partial gelling or curing of the mass, and in the second of which the final fluxing or curing is accomplished in the absence of the shaping punch. Thus the process can be accomplished quickly, and a minimum time is required in contact with the heated punch and a saving occurs in the number of punches required for forming a given quantity of closure caps per unit of time, and the production per unit of time per punch is greatly increased, and with a corresponding economy by reason of the lesser cost of oven curing over curing in closed molds.

In this manner, there is no material loss, as the measured amount of liquid is delivered into each shell; there is no volatile component to be driven off; the composition can be molded under low pressures, so that the equipment need not be designed for high pressures; the compound can be molded easily and fluxed in stages to produce a final article having the optimum contour for economy in material and performance as a seal; and at appropriate and easily attainable temperatures the pasty compound is fused or fluxed to form a tough resilient liner within times for the separate steps and a total time which are very short compared to the times for curing rubber or like compositions or for driving water or solvents out of liquid compositions containing the same as a distributing or fluidifying agent.

An example of practice of the invention is shown on the accompanying drawing, in which Fig. 1 is a diagrammatic showing of the successive steps of producing a crown seal or cap according to this invention and Fig. 2 is an axial cross-section through such a crown seal.

In Fig. 1, a series of crown shells 10 are shown advancing through the several steps of operation.

The crown shells may be prepared in the customary fashion by providing a sheet or steel or tin plate, with lithographed advertising matter on one face, and with a coating of a lacquer at the other or inner face, as more closely described hereinafter. The sheets thus coated and baked are then passed through punch presses in the presently customary fashion for example, whereby several hundred such crown shells are blanked and formed from a single sheet.

The composition of resin particles with plasticizer, the resin being essentially insoluble in the plasticizer at room temperature but soluble therein at an elevated temperature so that upon cooling a form-maintaining permanent, rubber-like gel results, is called a "paste-resin" in the plastics industry. For present purposes, they are characterized in that they contain no foreign material as a fluidifying agent, which must be expelled to produce the final gel: and since the action is largely one of fluxing or inter-solution of the resin and plasticizer, there is essentially no change in volume as the hot mixture changes to the gel form.

Such crown shells may then be passed through the steps of the present procedure, as indicated in Fig. 1 by the successive crown shells 10, 12, 22, 26, 28, 29 and 30. The first step after a crown shell such as 10 is introduced to the procedure, is that of depositing in the concave-upward crown shell, illustratively crown shell 12, a quantity of the mixture of resin and plasticizer. The present preference is for the crown shell to be cold when the deposit begins; but it may be preheated if desired. This deposit may be accomplished by warming the material to a temperature of about 110° F. to 115° F., so that it flows to and through the nozzle 11 and provides a deposit of a standard quantity in the crown shell 12. The nozzle and material may be kept warm by suitable means, such as infra-red radiation from the electric bulb 13. It has been found that a volume of 100 to 400 cubic millimeters is a desirable quantity, the smaller volumes being usable with short-skirt shells, and the larger volumes with the so-called standard-skirt shells; it being understood that smaller volumes are permissible when the containers to be sealed are known to have close tolerances for irregular lip surfaces as compared with some bottles where greater allowances by greater thicknesses of cushions and corresponding larger volumes of paste are required. In general, the lower limit of volume for a specific employment depends upon the degree of sealing efficiency required as the sealing efficiency decreases with the volume of compound, particularly in the lower ranges. The upper limit depends upon the amount of compound that can be put into the shell without interfering with the sealing, and on economies. Under these conditions, the introduced material forms a button 14 of about three-eighths of an inch to three-quarters of an inch diameter at the center of the cap.

The next step of illustrative operation is that of placing the crown shell, illustratively the crown shell 22 in Fig. 1, upon a heating platen 20 illustrated as a hot plate having a heater 21 therebeneath. The introduced material 14 is thus warmed by heat transferred from the platen 20 through the crown shell. Also, a heated punch or plunger 23 is aligned with the receiving cavity in platen 20: this punch having an outer diameter closely corresponding to the inside diameter of the crown shell; the punch has a heating means illustrated as an electric heating wire 24, and may have a projecting shaped extension 25 at its lower or engaging end, this projection being of lesser diameter than the body of the punch and extending below the general annular area at the bottom of the main body of the punch.

The punch 23 is brought down into the crown shell, so that the button 14 of material is both heated and compressed, whereby its liquidity momentarily increases, and parts of the mass are displaced relatively outwardly from the axis of the punch and crown shell. The flowing and distribution of the heated composition thus establishes a shape determined by the crown shell acting as a mold, and by the punch acting to form the later-exposed surface of the cushion piece. At the same time, the increase of temperature of the composition causes a partial fusing or fluxing of the resin and plasticizer so that a non-tacky, form-maintaining cushion piece is formed which is adherent to the lacquered crown shell and non-adherent to the molding punch.

The next step of operation is to thus remove the crown shell with the shaped and partially fluxed mass 27 therein, and introduce the same to a baking oven 35 which is conventionally shown as having a conveyer belt 36 moving therethrough and being provided with heating means, for example the hot air inlet flux 37. Fig. 1 shows a number of such crown seals, comprising individual crown shells 28, 29, 30 with a shaped and form-maintaining cushion pad 27 in each of them, each on its way through the oven 35, so that each pad is brought before its discharge from the oven to the condition of a homogeneous and form-maintaining mass which, after cooling, constitutes a permanent rubbery elastic gel.

Upon completion of the curing in the oven, the crown seal or cap has the components illustrated in Fig. 2. The crown seal shown generally at 40 has a circular portion 41, bounded at its periphery by the smoothly curved top corner radius 42 leading to the corrugated skirt portion 43. The outer surface may have been decorated or have a lacquer coating 44 which has been baked until it is free of tackiness or flow at the temperatures of operation during the process steps shown in Fig. 1. The inner surface has a lacquer coating 45 and the shaped mass of cushion material is adhered thereto. The shaped mass itself has a thin central web portion 47, opposite the hole in the mouth of the container and a thicker annular portion 48 for contact with the lip of the container.

The lacquer 45 for the inner surface of such compound-lined crowns may desirably be selected in accordance with the material employed for the compound and in accordance with the intended contents of the container to be sealed. For example, a vinyl lacquer prepared as described in the Maier et al. Patent 2,380,456, with 80 per cent of vinyl chloride-vinyl acetate copolymer resin and 20 per cent of oleoresinous modifier produces a satisfactory adhesion. When the crown seals are to be employed with carbonated beverages, beer, fruit juices, vinegar, etc., it is preferred to employ a trimer lacquer having a corresponding solids formulation of 80 per cent of vinyl chloride-vinyl acetate copolymerized in the presence of maleic anhydride as a modifier, for example in the respective ratios of 85:13:2, together with 20 per cent of a phenolic resin derived from ortho-cresol. Either of these lacquers can be prepared in an organic solvent, such as 70% xylol and 30% isophorone, with 20% solids, for roller coating. For spraying, more volatile solvents, such as toluol, methyl ethyl ketone, and methyl isobutyl ketone, can be used. After applying and drying, the coating is baked.

The composition forming the principal mass of the shaped cushion pad has two basic ingredients comprising an elastomer and a plasticizer therefor, the plasticizer being so selected that the elastomer is not actively soluble, i. e. essentially insoluble, therein at room temperature, but is soluble at some elevated temperature. These two ingredients are ground together to form a paste which is fluent under the conditions stated, and may also include other components such as inert fillers to limit cutting, modifying resins to assist control of the physical properties, stabilizers for the resins and other components, waxes to prevent blocking and to reduce moisture vapor and gas permeability, etc. However, these other materials are not essential in the composition, but may be employed to contribute to the desired properties for the particular employment. In general, the formulations described in the Foye United States Patent 2,489,407 and in South African Patent No. 2556/47 may be employed, noting that the filler and other components may be omitted if so desired.

The elastomer component may be a vinyl resin of the class inclusive of polyvinyl chloride, copolymers of vinyl chloride and vinyl acetate such as the 97:3 per cent copolymer, vinylidene chloride polymers, and copolymers of vinyl chloride and vinylidene chloride. The chloride content should be high, when the seal is to resist aqueous liquids; such as 90 per cent vinyl chloride in a copolymer.

Among the plasticizers useful are those which have a very slow wetting or dissolving action upon the selected vinyl resin at room temperature and at temperatures up to around 115° F. The ester type plasticizers of vinyl resins have this general characteristic, and require higher temperatures for producing penetration, diffusion, and inter-solution. A preferred plasticizer is dioctyl phthalate: others are dibutyl phthalate, dioctyl sebacate, and tricresyl phosphate. The plasticizer should be liquid at the temperature of use.

The ratio of the elastomer and plasticizer, by weight, may be from 6:4 to 4:6, with preference for a ratio of about 1:1.

Such compositions can be introduced at about 110 degrees to 115 degrees F. through the nozzle 11, and then caused to flow, be shaped by the punch 23, and heated in the successive stages for partial fluxing and final fluxing, resulting in the production of a resilient, tough, plasticized resin mass.

Illustrative of the condition for the molding and curing operation is the employment of 10 to 30 pounds pressure per square inch in a crown shell having a one-sixteenth inch radius at the top corner, or 10 to 100 pounds pressure per square inch in a crown shell having a three thirty-seconds inch radius at the top corner, with the punch designed as shown in Fig. 1, to produce a smooth surface for the annulus 48 shown in Fig. 2. In general, the pressure is dependent (a) upon the design of the punch, the more complex shapes of seals requiring higher molding pressures; and (b) upon the volume of compound being used, as higher pressures are desirable with the lower volumes.

The temperature employed during the distribution and for molding of the composition to shape, and for producing the partial fluxing, depends in practice upon the characteristics of the original coating lacquer 45 and the composition for the cushion material. The temperature can range from 275 degrees F. to 325 degrees F. for the partial fluxing, in commercial practice with the materials specifically described.

The time required for molding is one to six seconds, for producing the aforesaid adhesion and partial fluxing or gelation. For example, using a temperature of 300 degrees F. and thirty pounds per square inch pressure, with a crown shell having a one-sixteenth inch top corner radius, the time required for producing a satisfactorily form-maintaining mass, with a 97:3 vinyl chloride-acetate copolymer, with dioctyl phthalate plasticizer, is about two to three seconds. The same time produces a like effect in the same material upon the same lacquer coating, when the top corner radius is three thirty-seconds of an inch and the pressure is seventy-five pounds per square inch. The maximum time for punch contact is a matter of economics of design of equipment and operation of existing equipment with specific compositions and temperatures, as excess time does not cause deterioration. The minimum time is that of producing a body which is of the intended shape and essentially form-maintaining at the prevailing temperature of the mass at release of the punch and the temperature at the oven inlet. The time and temperature for the partial fluxing are, in general, inversely related to one another. As the partial fluxing progresses, the originally pasty and sticky mass becomes stiffer and loses its tackiness; so during employment of lacquered shells and of punches having low inherent adhesion to the composition, a useful rule-of-thumb control is to observe that the punches separate from the masses without deformation thereof, as when the pads are in this partially-fluxed condition, they are essentially form-maintaining.

The form-maintaining cushion pads, in their individual crown shells, may then be oven cured in bulk or individually, the oven temperature being for example between 300 degrees F. and 400 degrees F., and the time of final fluxing treatment being from forty-five seconds to three minutes, depending upon the oven air velocity and its capability of delivering the necessary heat to the masses for provoking the thorough diffusion of components for producing a uniform consistency. It will be noted that the partial fluxing is accomplished by penetration of the plasticizer into the resin, producing a swelling and/or solution of such resin, and thereby an increasing viscosity of the entire mass, and a relative reduction of the unaffected resin and plasticizer. Therefore, the subjection of the mass later to the identical temperature does not cause any increase in fluidity thereof, and by the introduction to the oven under the usual conditions of gradually increasing temperature, the seals can be carried to a preferred final oven temperature of about 380 degrees F. in forty-five seconds, in an air oven having a high air velocity, and the diffusion and curing is completed, and the final fluxed product is form-maintaining both at oven temperature and room temperature, and has the desirable attributes of resiliency, toughness, inertness to carbonated beverages, beer, etc., so that it has no effect upon their flavor or consistency, and exhibits substantially uniform properties at the normal range of temperatures to which the containers are subjected.

While the invention has been illustrated by a practice of making crown seals with lacquered metal shells, and employing the stated materials and conditions, it will be understood that it may be embodied in other forms within the scope of the appended claims.

I claim:

1. The method of forming sealing pads for closure seals, comprising discharging into a closure shell a quantity of a semi-liquid resinous material comprising particles of a resin dispersed in a fluid resin plasticizer, pressing a heated forming plunger against the material while the closure shell is on a heated support for shaping the material into a sealing pad, maintaining the heat and pressure until the material adheres to the closure shell and has partially gelled into a shaped form-maintaining mass, and then disengaging the plunger and further heating the shaped mass until the material has become a cured essentially uniform mass.

2. The method of forming sealing pads for closure seals, comprising discharging into a closure shell having an internal lacquer coating of vinyl resin, a quantity of a semi-liquid resinous material comprising particles of a vinyl resin dispersed in a fluid vinyl resin plasticizer, pressing a heated forming plunger against the material while the closure shell is on a heated support for shaping the material into a sealing pad having an annular thickened portion and a central thin portion, maintaining the heat and pressure until the material adheres to the closure shell and has partially gelled into a shaped form-maintaining mass, and then disengaging the plunger and further heating the shaped mass until the material has become a cured essentially uniform mass.

3. The method of making closure seals having therein shaped and cured cushion pads, which comprises providing a closure shell having an internal lacquer coating exhibiting a vinyl resin at the exposed side thereof, depositing in the closure shell and upon said exposed coating thereof a measured quantity of a mass comprising particles of a vinyl resin dispersed in a fluid vinyl resin plasticizer, heating the mass and compressing the same in the closure shell by a heated shaping surface whereby to shape the mass and provoke a penetration of plasticizer into said lacquer coating and provoke a partial dissolution of the vinyl resin particles into the plasticizer and thereby forming a shaped, non-tacky and form-maintaining mass, removing the pressure before the dissolution is completed, and thereafter further heating the closure shell with the form-maintaining shaped mass therein to cause a completed dissolution and formation of an essentially uniform mass.

4. The method of making closure seals, which comprises depositing at a temperature of fluid flow into a closure shell a quantity of resin paste having as dominant gel-forming elements thereof finely divided resin particles suspended in a resin plasticizer which is not an active solvent of the resin at said temperature of fluid flow of the resin paste and which is an active solvent thereof at a higher fusion temperature, pressing a heated forming surface against the deposit and thereby shaping the same, maintaining the deposit at fluxing temperature and essentially confined between the shell and said surface until the resin and plasticizer have partially fused together to constitute a shaped and form-maintaining mass, then disengaging the forming surface, and thereafter heating the shaped mass at fluxing temperature until the material has become a cured essentially uniform mass.

5. The method of making closure seals, which comprises depositing at a temperature of fluid flow into a closure shell having an internal lacquer coating of vinyl resin, a quantity of resin paste having as dominant gel-forming elements thereof finely divided resin particles suspended in a resin plasticizer which is not an active solvent of the resin at said temperature of fluid flow of the resin paste which is an active solvent thereof at a higher and fusion temperature, pressing a heated forming surface against the deposit and thereby shaping the same, maintaining the deposit at fusion temperature and essentially confined between the shell and said surface until the mass adheres to the lacquer coating and until the resin and plasticizer have partially fluxed together to constitute a non-tacky shaped and form-maintaining mass, then disengaging the forming surface, and thereafter heating the shaped mass at fluxing temperature until the material has become a cured essentially uniform mass.

6. The method of making crown seals, which comprises depositing at a temperature of about 110 degrees to 115 degrees F. into an internally lacquered metal crown shell a quantity of 100 to 400 cubic millimeters of a semi-liquid paste composition consisting for essential components thereof of a finely divided vinyl resin and a normally liquid ester plasticizer of the vinyl resin which forms a fluid paste with the resin at said temperature, said composition being capable upon being heated to a fusion temperature of 275 to 375 degrees F. and thereafter being cooled of forming a permanent rubbery gel, pressing a heated forming surface against the deposited material for shaping the same and heating the material for causing the same to adhere strongly to the lacquer coating and to become a non-tacky shaped form-maintaining mass, removing the said forming surface when the material has become non-tacky and before the fusion is complete, and thereafter heating the material to fusion in the essential absence of confinement and pressure.

7. The method of making closure seals, which comprises depositing at a temperature of fluid flow into a cold internally lacquered closure shell a standard quantity of a resin paste comprising finely divided particles of a resin dispersed in a fluid resin plasticizer which is not an active solvent of the resin at said temperature of fluid flow of the resin paste and which is an active solvent thereof at a higher and fluxing temperature, said deposit being made upon a part of the area of inner surface of the closure shell, pressing a heated forming surface against the deposit and thereby distributing and shaping the same, heating the closure shell whereby to provoke increased adhesion of the mass to the lacquer coating and heating the mass from the said forming surface whereby to provoke a partial fusion of the resin and plasticizer into a non-tacky and form-maintaining condition, removing the mass from the forming surface and thereafter heating the closure shell and the mass adherent thereto for producing a completed fusion of the resin and plasticizer into a uniform state.

8. The method of forming sealing pads for crown seals, comprising discharging into an internally lacquered crown shell a measured amount of a semi-liquid resinous material comprising particles of a vinyl resin dispersed in a fluid vinyl resin plasticizer, pressing a heated forming plunger against the material while the crown shell is on a heated support for shaping the material into a sealing pad of the desired contour, maintaining the heat and pressure until the material adheres to the lacquered crown shell and has partially gelled into a shaped mass having a non-tacky surface, and then disengaging the plunger and further heating the shaped mass until the material has become a cured essentially uniform mass.

CURTIS E. MAIER.

References Cited in the file of this patent

UNITED STATES PATENTS

| Number | Name | Date |
| --- | --- | --- |
| 1,486,937 | Taliaferro | Mar. 18, 1924 |
| 1,738,612 | Recht | Dec. 10, 1929 |
| 2,489,407 | Foye | Nov. 29, 1949 |

FOREIGN PATENTS

| Number | Country | Date |
| --- | --- | --- |
| 500,298 | Great Britain | Feb. 7, 1939 |